(12) United States Patent
Kotzin

(10) Patent No.: US 6,957,092 B2
(45) Date of Patent: Oct. 18, 2005

(54) DISPOSABLE DEVICE WITH REMOVABLE RADIO MODULE

(75) Inventor: Michael Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 157 days.

(21) Appl. No.: 10/331,807

(22) Filed: Dec. 30, 2002

(65) Prior Publication Data
US 2004/0198472 A1 Oct. 7, 2004

(51) Int. Cl.⁷ .................. H04M 1/00; H04M 11/00; H04M 11/04
(52) U.S. Cl. ............... 455/575.8; 455/575.1; 455/550.1; 455/409; 455/404.1; 455/90.3
(58) Field of Search .................. 455/404.1, 409, 455/414.1, 550.1, 575.1, 575.8, 90.3

(56) References Cited

U.S. PATENT DOCUMENTS

| | | | |
|---|---|---|---|
| 4,773,541 A * | 9/1988 | Riddell .................. 229/235 |
| 4,954,858 A * | 9/1990 | Ohmura et al. .......... 396/180 |
| 5,557,653 A * | 9/1996 | Paterson et al. ......... 455/575.2 |
| 5,596,385 A | 1/1997 | Cranshoff |
| 5,732,331 A * | 3/1998 | Harms .................. 455/575.3 |
| 5,818,915 A | 10/1998 | Hayes, Jr. et al. |
| 5,832,371 A | 11/1998 | Thornton |
| 5,839,058 A | 11/1998 | Phillips et al. |
| 5,845,218 A * | 12/1998 | Altschul ................ 455/565 |
| 5,870,459 A | 2/1999 | Phillips et al. |
| 5,946,613 A | 8/1999 | Hayes, Jr. et al. |
| 5,966,654 A | 10/1999 | Croughwell et al. |
| 6,816,738 B2 * | 11/2004 | Posey ................... 455/550.1 |
| 2003/0054778 A1 * | 3/2003 | Hecht ................... 455/115 |
| 2004/0063463 A1 * | 4/2004 | Boivin .................. 455/558 |

FOREIGN PATENT DOCUMENTS

| | | | | |
|---|---|---|---|---|
| WO | WO 9603001 A1 * | 2/1996 | .......... | H04M 17/00 |
| WO | WO 03030381 A1 * | 4/2003 | .......... | H04B 1/38 |

* cited by examiner

*Primary Examiner*—Nick Corsaro
*Assistant Examiner*—Raymond B. Persino
(74) *Attorney, Agent, or Firm*—Matthew C. Loppnow

(57) ABSTRACT

A method and apparatus for a disposable mobile communication device having a destructively removable radio module. The mobile communication device can include a disposable frame, a radio module coupled to the disposable frame, the radio module being irreplaceably removable from the disposable frame, an audio input module coupled to the disposable frame and the radio module, an audio output module coupled to the disposable frame and the radio module, a power supply module coupled to the disposable frame and the radio module, and an antenna coupled to the disposable frame and the radio module. The radio module can include a radio baseband processing module, an audio input, and an audio output.

29 Claims, 3 Drawing Sheets

DISPOSABLE DEVICE WITH REMOVABLE RADIO MODULE

BACKGROUND OF THE INVENTION

1. Field of Invention

The present invention is directed to a disposable device with a removable radio module. In particular, the present invention is directed to a method and apparatus for a disposable mobile communication device having a destructively removable radio module.

2. Description of Related Art

Presently, mobile communication devices such as cellular phones are becoming increasingly popular. As the popularity increases, there is an increasing drive to incorporate additional features into the devices to increase the desire to purchase one device over another. For example, elaborate additional features such as color screens, video and music players, higher fidelity speakers, personal digital assistant features, enhanced buttons and keypads, elaborate housings, and numerous other features are being incorporated into mobile communication devices.

Unfortunately, elaborate additional features increase the price of mobile communication devices. For example, color screens are more expensive than monochrome screens and metal housings are more expensive than plastic housings. Incorporating these features into a mobile communication device increases the cost of the device which results in increased prices of the device and increased prices of service plans to recover the cost of the device.

Another problem exists in that a user may initially purchase a limited feature or cheaper quality mobile communication device, but may later desire a mobile communication device with more features. Unfortunately, the user must then purchase an entirely new mobile communication device to obtain the new features. The new mobile communication device is usually expensive and also may require a new service contract to reduce the price of the device.

Thus, there is a need for a method and apparatus for a disposable mobile communication device having a radio module that is removable for insertion into a new mobile communication device.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
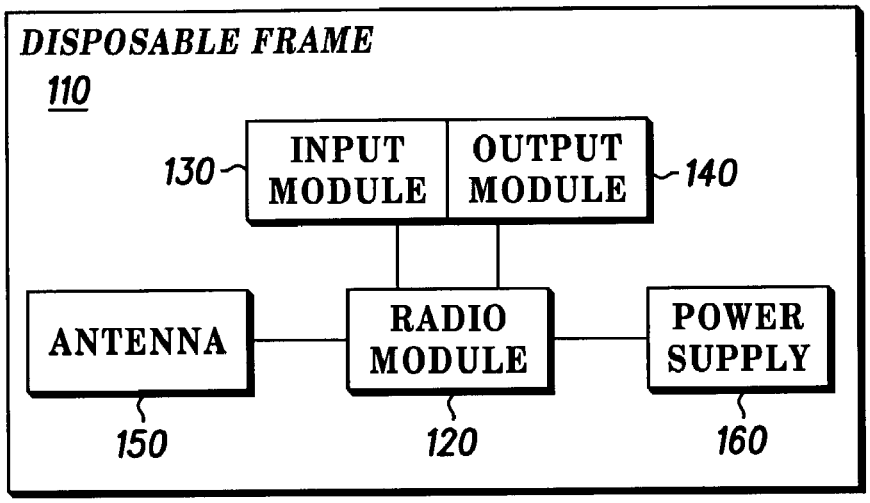
FIG. 1 is an exemplary block diagram of a mobile communication device according to a preferred embodiment of the invention.

The present invention is directed to a method and apparatus for a disposable mobile communication device having a destructively removable radio module. According to one embodiment, the present invention provides a mobile communication device. The mobile communication device can include a disposable frame, a radio module coupled to the disposable frame, the radio module being irreplaceably removable from the disposable frame, an audio input module coupled to the disposable frame and the radio module, an audio output module coupled to the disposable frame and the radio module, a power supply module coupled to the disposable frame and the radio module, and an antenna coupled to the disposable frame and the radio module. The radio module can include a radio baseband processing module, an audio input, and an audio output.

The audio input module can include an earpiece and acoustic porting coupled between the earpiece and the radio module and the audio output module can include a mouthpiece and acoustic porting coupled between the mouthpiece and the radio module. Also, the audio input module can include a microphone and the audio output module can include a speaker. The audio input module and the audio output module can also be input and output portions of a headset jack.

The disposable frame can be constructed of cardboard, the audio input module can be an earpiece constructed of vacuum formed plastic, and the audio output module can be an earpiece constructed of vacuum formed plastic. The disposable frame can include a radio module destructive removal port for destructive removal of the radio module from the frame while maintaining operability of the radio module. The mobile communication device can include breakable solder bumps and the radio module can be coupled to at least the disposable frame and the power supply module using the breakable solder bumps. The mobile communication device can also include conductive glue and the radio module can be coupled to at least the disposable frame and the power supply module using the conductive glue.

The mobile communication device can additionally include a switch coupled to the radio module and the radio module can be configured to establish a mobile communication connection with a network in response to activation of the switch. The mobile communication device can further include a radio module socket coupled to the disposable frame, the radio module socket also coupled to the audio input module, the audio output module, the power supply module, and the antenna, and the radio module can be detachably coupled to the radio module socket.

According to another embodiment, the present invention provides a disposable mobile communication device. The disposable mobile communication device can include a disposable frame, a switch coupled to the frame, and a radio module destructively coupled to the disposable frame and the switch. The radio module can be permanently removable from the disposable frame and the radio module can be configured to perform radio baseband processing for a mobile communication network connection, the radio module further being configured to enable a mobile communication network connection in response to activation of the switch. The mobile communication device can also include an audio input module coupled to the disposable frame and the radio module, an audio output module coupled to the disposable frame and the radio module, a power supply module coupled to the disposable frame and the radio module, and an antenna coupled to the disposable frame and the radio module.

The disposable frame can include a cardboard base and a vacuum formed plastic housing with the vacuum formed plastic housing covering the radio module on the cardboard base. The disposable frame can include a destructive radio module removal port for destructive removal of the radio module from the frame while maintaining the operability of the radio module. The audio input module can be an earpiece and acoustic porting coupled between the earpiece and the radio module and the audio output module can be a mouthpiece and acoustic porting coupled between the mouthpiece and the radio module. The disposable mobile communication device can also include a radio module socket coupled to the disposable frame, the radio module socket also coupled to the audio input module, the audio output module, the power supply module, and the antenna, where the radio module is detachably coupled to the radio module socket.

According to another embodiment, the present invention provides a method of operating a disposable first mobile communication device, the disposable first mobile communication device including a radio module and a disposable frame. The method can include establishing a mobile communication network connection with a mobile communication network, destructively removing the radio module from the disposable frame to render the disposable frame non-reusable while maintaining the operability of the radio module, and inserting the radio module into a second mobile communication device. Destructively removing the radio module can include destructively removing the radio module from the disposable frame via a radio module removal port while maintaining the operability of the radio module.

Thus, among other benefits, the present invention provides for an inexpensive but functional mobile communication device with simple features. The mobile communication device provides for at least initial communication for network registration. The mobile communication device can also provide for normal subscriber device functionality such as simple mobile communications. The radio module in the mobile communication device can be easily upgraded by permanently removing the radio module and inserting it into a new mobile communication device.

The low cost disposable frame can provide a housing for the radio module and other components of the mobile communication device. Thus, the disposable frame can provide for a feeling of substantial weight and size and also provide protection for the radio module.

The present invention can also provide for an inexpensive mobile phone that can be used for emergency purposes. Also, the invention can provide a variety of disposable frames that allow for wide and inexpensive distribution of the radio module to support simple transactions and contests.

The present invention also allows the powering up of the mobile communication device for an initial communication connection before sale to a user. For example, the present invention allows for initial setup of the radio module. The initial setup can provide for over the air programming, testing, demonstration, postponement, and other initial features. As another example, the present invention can provide for initial over the air setup in a phone mode before inserting the radio module into another device such as a computer modem. As another example, the radio module can contain a user identification code that allows the user identification to be transferred from device to device but still be associated with the original user. The radio module might also have memory such that stored information, such as phone book information, is not lost in moving the radio module from device to device.

Furthermore the present invention can also provide for user safety. For example, often components must be specifically inserted into a mobile communication device to comply with user safety specifications. By providing for destructive removal of a radio module, a user is not tempted to improperly reinsert the radio module into the original device. Furthermore, a new device may be provided with a specific socket that forces proper insertion into the new device. These and further benefits will become more apparent with reference to the Figures and the descriptions of the preferred embodiments.

FIG. 1 is an exemplary block diagram of a mobile communication device 100 according to one embodiment of the invention. The mobile communication device 100 may be a telephone, a wireless telephone, a cellular telephone, a PDA, a modem, a pager, or any other device that is capable of sending and receiving communications. Preferably, the mobile communication device 100 is a mobile communication device such as a portable phone. The mobile communication device 100 can include a disposable frame 110, a radio module 120 coupled to the disposable frame 110, an audio input module 130 coupled to the disposable frame 110 and the radio module 120, an audio output module 140 coupled to the disposable frame 110 and the radio module 120, a power supply module 160 coupled to the disposable frame 110 and the radio module 120, and an antenna 150 coupled to the disposable frame 110 and the radio module 120.

The power supply module 160 may be a disposable battery, may be terminals for batteries, may be a battery cavity, may be a rechargeable battery, or may be any other device useful for providing power to a mobile communication device. The antenna 150 may be a foil antenna, a whip antenna, an antenna connection port, or any other antenna device useful for a mobile communication device.

The radio module 120 can be permanently, irreplaceably, and destructively removable from the disposable frame 110 while maintaining the operability of the radio module 120. In particular, the radio module 120 can be coupled to the frame using breakable solder bumps, conductive glue, zebra strips, a radio module socket, breakable wires, a breakable latch, breakable plastic, perforated cardboard, a cuttable material, peelable material, a pryable connection, a mild adhesive, or any other connections that allow the irreplaceable removal of the radio module 120 from the disposable frame 110. These connections may be placed in a radio module destructive removal port. For example, the solder bumps may be broken when the radio module 120 is removed to prevent replacement of the radio module 120 on the disposable frame 110 without effort to resolder the radio module 120 to the disposable frame 110. As another example, zebra strips such as thin conductive strips can be used to connect the radio module 120 to the disposable frame 110. These strips can be used in conjunction with a pressure holding means which allows connection between conductors on the radio module 120 and foil circuitry on the disposable frame 100. Thus, it may be difficult to reposition the radio module 120 on the disposable frame 110 without delicate repositioning using precise tools. As a further example, a fixed latch may hold the radio module 120 in place. To remove the radio module 120, the latch must be broken.

The input module 130 can include a microphone, an audio input device, a switch, or any other input device. The output module 140 can include a speaker, an audio input device, a display, or any other output device. The input module 130 and the output module 140 can also include a headset jack for a mobile communication device headset. Thus, a mobile communication device headset can be plugged into the headset jack for audio input and output functions. Furthermore, the input module 130 and the output module 140 can be made of vacuum formed plastic such as blisterpack, made of cardboard, or made of any other inexpensive or disposable material. Also, the disposable frame 110 and any other components of the mobile communication device 100 can be made of cardboard, vacuum formed plastic such as blisterpack, or any other inexpensive or disposable material.

In operation, the radio module 120 can perform at least radio baseband processing for a mobile communication network connection for the mobile communication device 100 in response to activation of an input of the input module 130. For example, a switch can be used to activate a mobile communication network connection. The connection can be used for activation of the mobile communication device 100, for communications, or for any other purpose. The radio module 120 can then perform radio baseband processing along with transmitter functions, receiver functions, coding and encoding functions, audio processing functions, input and output functions, power control functions, and any other functions useful in a mobile communication device.

Also, the radio module 120 can be irreplaceably removed from the frame 110. For example, when the radio module 120 is removed from the frame, the radio module cannot be replaced into the frame without significant effort or tools. Thus, the removal of the radio module 120 is destructive and permanent in that the radio module 120 can no longer function in the mobile communication device 100 once removed. The radio module 120 can then be placed in a replacement mobile communication device. This provides for upgradability of the mobile communication device 100. In particular, the mobile communication device 100 may be inexpensive and contain minimal features. A mobile communication connection can be established using the mobile communication device 100. For example, a user can use a switch to activate the connection and enable the mobile communication device 100. The user can also use voice recognition to enter a desired phone number. Alternatively, the module might be programmed to call a certain number upon activation when affixed in the disposable frame.

Additional features can be included in the radio module 120. For example, the radio module 120 can retain a user profile, user preferences, user passwords, and the like. Thus, this user data and preferences can be easily transferred to a new mobile communication device. Furthermore, certain features and functions may reside outside of the radio module 120 in separate modules on the mobile communication device 100. For example, a transceiver, memory, power control unit, input and output module, or any other functions may reside outside of the radio module 120 on the mobile communication device 100. Accordingly, the radio module 120 may only include certain functionality and the external functionality may be left behind and upgraded when the radio module 120 is transferred to a new mobile communication device.

Therefore, a user can easily and quickly obtain an inexpensive working mobile communication device. Then, when the user desires more features, the user can remove the radio module 120 from the mobile communication device 100 and place the radio module 120 into a new mobile communication device.

Figure 2:
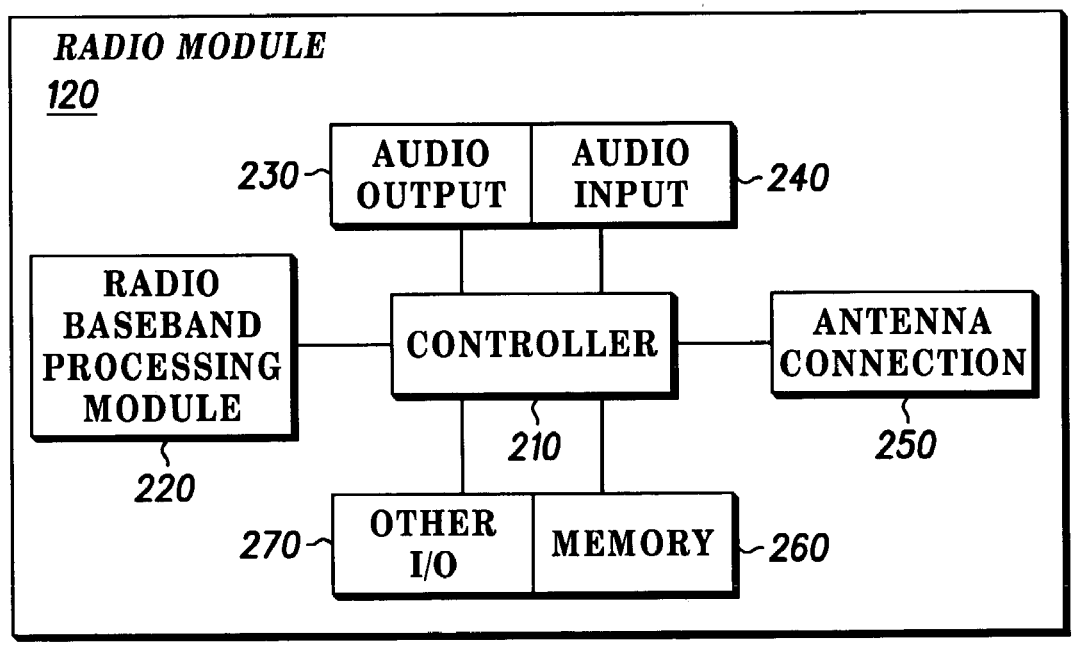
FIG. 2 is an exemplary block diagram of a radio module according to a preferred embodiment of the invention.

FIG. 2 is an exemplary block diagram of a radio module 120 according to one embodiment of the invention. The radio module 120 can include a controller 210, a radio baseband processing module 220, an audio output 230, an audio input 240, an antenna connection 250, a memory 260, and other input and output components 270. The antenna connection 250 may include antenna coupling circuitry, antenna matching circuitry, a direct antenna connection, or any other means for antenna connection. The other input and output components 270 may include a connection for a display, a connection for a keypad, a switch, or any other input and output components useful in a mobile communication device. The audio input 240 can be a microphone, a microphone connection for an external microphone, or any other device for providing audio input to a device. The audio output 230 can be a speaker, a speaker connection, or any other device for providing audio output from a device.

The memory 260 may be a read only memory, a random access memory, an optical memory, or any other device useful for storing data. The controller 210 can control the operations of the radio module 120 and the mobile communication device 100. For example, the controller 210 can execute program code stored in the memory 260, manipulate data stored in the memory 260, control input and output functions of the mobile communication device 100, control power management of the mobile communication device 100, or provide any other functions useful in a mobile communication device.

The radio baseband processing module 220 may be a separate component, may be incorporated into the controller 210, may reside in software in the memory 260, or may be incorporated into the mobile communication device 100 by any other means. The radio baseband processing module 220 can provide for processing for a mobile communication device network connection. For example, the radio baseband processing module 220 can provide for multiple cell combining, closed and open loop power control, soft handoff of a connection, error correction coding, adaptive rate speech transmission, or any other mobile communication device functions.

Figure 3:
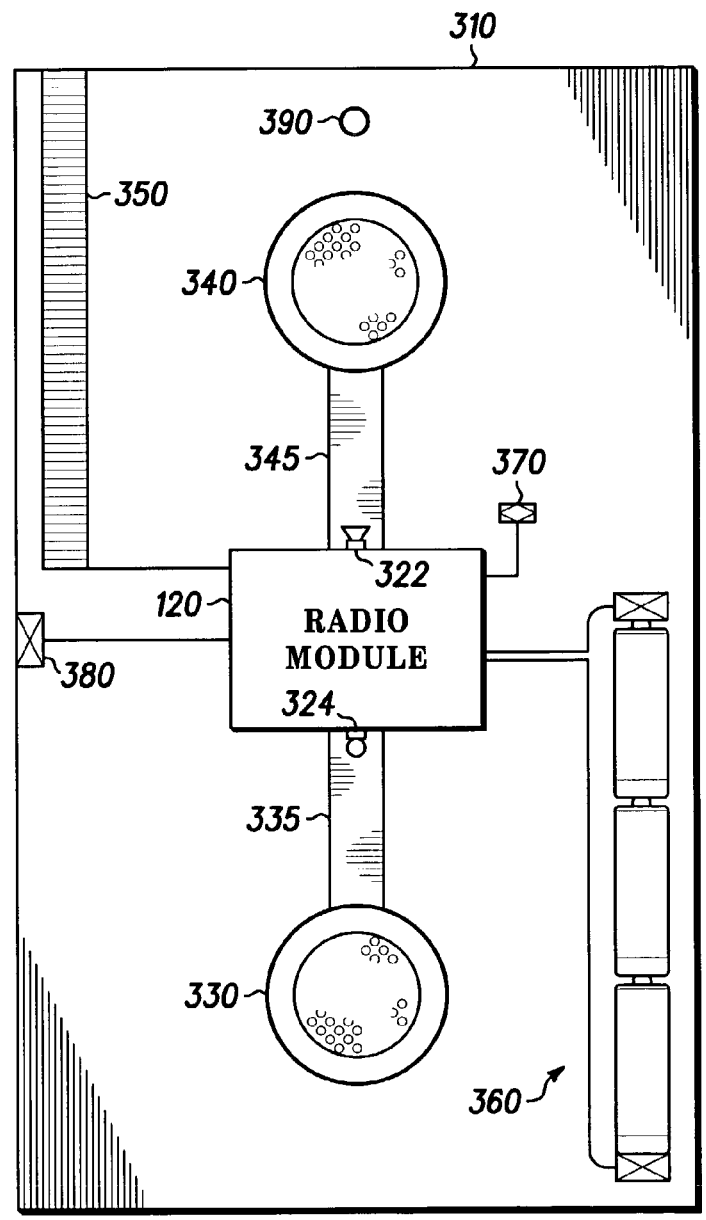
FIG. 3 is an exemplary illustration of a mobile communication device according to a first embodiment of the invention.

FIG. 3 is an exemplary illustration of a mobile communication device 300 according to a first embodiment of the invention. The mobile communication device 300 can include a frame 310, a radio module 120, an input module such as a mouthpiece 330, an input acoustic porting 335 coupled between the input module 330 and the radio module 120, an output module such as an earpiece 340, an output acoustic porting 345 coupled between the output module 340 and the radio module 120, an antenna 350, a power supply 360, a switch 370, an input and/or output port 380, and a storage hole 390. The switch 370 can be a button, a toggle switch, a key on a keypad, or any other input device.

In this embodiment, the radio module 120 can include a speaker 322 and a microphone 324. Thus, audio signals at the input module 330 can be funneled through the input acoustical porting 335 to the microphone 324. Also, audio signals can be funneled through the output acoustic porting 345 from the speaker 322 to the output module 340. The power supply 360 can provide power to the mobile communication device 300. The antenna 350 can provide for transmission and reception of signals at the mobile communication device 300. The port 380 can provide for additional input and output devices such as a headset, a switch, a keypad, a display, or any other input and output devices. The switch 370 can be used for input to the mobile communication device 300. The storage hole 390 may be used for storing the mobile communication device 300, for example, on a hook or a display in a store.

In operation, the radio module 120 can enable a mobile communication network connection with a network in response to activation of the switch 370. The radio module 120 can also perform radio baseband processing for the mobile communication network connection. Furthermore, the radio module 120 can be permanently removed from the frame 310. For example, once removed, the radio module 120 cannot be functionally reattached to the frame 310 without excessive effort or precise tools. The radio module 120 may then be inserted into a new mobile communication device.

Figure 4:
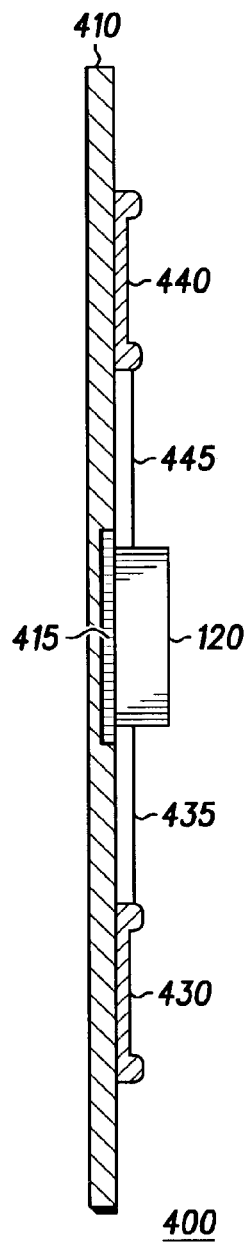
FIG. 4 is an exemplary illustration of a side view of a mobile communication device according to a second embodiment of the invention.

FIG. 4 is an exemplary illustration of a side view of a mobile communication device 400 according to a second embodiment of the invention. The mobile communication device 400 can include a frame 410, a socket 415, a radio module 120, an audio input module such as a mouthpiece 430, an input acoustic porting 435, an audio output module such as an earpiece 440, and an output acoustic porting 445. The components of the mobile communication device 400 can operate in a similar manner to the like components of the mobile communication device 300. Additionally, the socket 415 can be used to contain the radio module 120 while allowing for its permanent removal. For example, the socket 415 may enclose the radio module 120 in thin plastic that must be broken to remove the radio module 120. The socket 415 may also include contacts for coupling the radio module 120 to the audio input module 430, the audio output module 440, a power supply similar to the power supply 360 and an antenna similar to the antenna 350. The contacts may be broken to remove the radio module 120. Additionally, the socket 415 may include a latch that must be broken to remove the radio module 120. Furthermore, the socket 415 may use any other feature for containing the radio module 120 while providing for permanent removal of the radio module 120.

Figure 5:
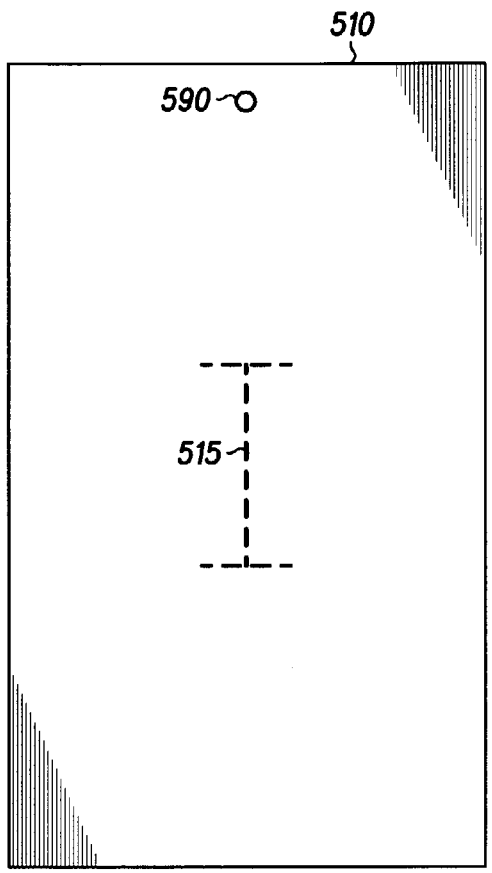
FIG. 5 is an exemplary illustration of a back view of a mobile communication device according to a third embodiment of the invention.

FIG. 5 is an exemplary illustration of a back view of a mobile communication device 500 according to a third embodiment of the invention. The mobile communication device 500 can include a frame 510, a destructive radio module removal port 515, and a storage hole 590. The mobile communication device 500 may also include other components similar to the mobile communication devices 300 and 400 which operate in a similar manner. The storage hole 590 may be used for storing the mobile communication device 500, for example, on a hook on a display in a store. The destructive radio module removal port 515 can provide for the permanent removal of the radio module 120 while maintaining the operability of the radio module 120. For example, the destructive radio module removal port 515 may include perforations that can be torn to remove the radio module 120. Also, the destructive radio module removal port 515 may provide visual indicators that indicate where the frame 510 must be cut to remove the radio module 120. Additionally, the destructive radio module removal port 515 may provide for any other method of destructive removal of the radio module 120.

Figure 6:
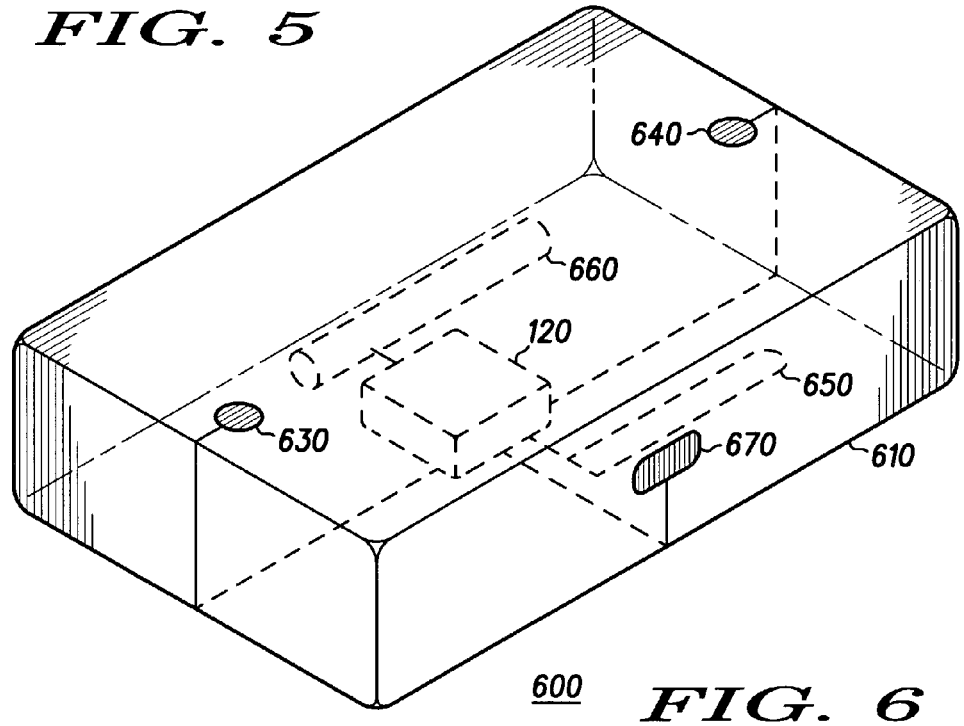
FIG. 6 is an exemplary illustration of a mobile communication device according to a fourth embodiment of the invention.

FIG. 6 is an exemplary illustration of a mobile communication device 600 according to a fourth embodiment of the invention. The mobile communication device 600 can include a frame 610 which may be a housing, a radio module 120, an input module 630 such as a microphone or any other audio input device coupled to the radio module 120, an output module 640 such as a speaker or any other audio output device coupled to the radio module 120, an antenna 650, a power supply 660, and a switch 670 such as a button, key, or any other input device. In this embodiment, that frame 610 may enclose components of the mobile communication device 600. Also, because of the microphone 630 and the speaker 640, the radio module 120 does not require an on-board microphone or speaker. Other elements of the mobile communication device 600 may operate in a similar manner to the other embodiments disclosed herein. Furthermore, the mobile communication device 600 may provide for the permanent removal of the radio module 120 by requiring the destruction of the frame 610. The mobile communication device 600 may also provide for the permanent removal of the radio module 120 by any of the other methods disclosed with respect to the other embodiments.

Figure 7:
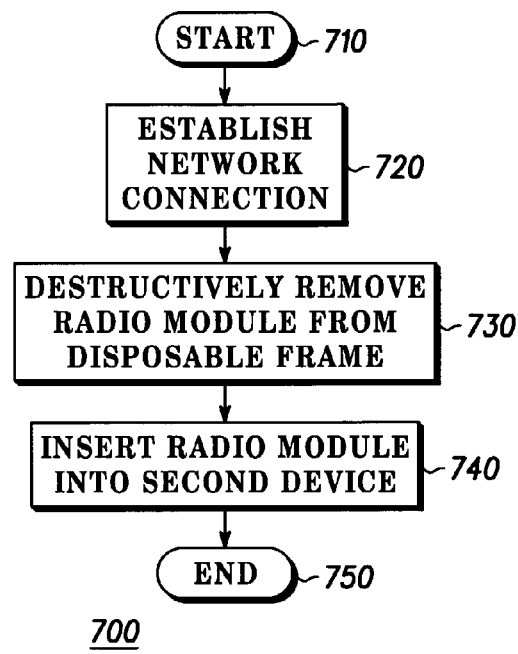
FIG. 7 is an exemplary flowchart outlining the operation of a mobile communication device according to a preferred embodiment of the invention.

FIG. 7 is an exemplary flowchart 700 outlining the operation of the mobile communication device 100 according to a preferred embodiment of the invention. In step 710, the flowchart 700 begins. In step 720, a mobile communication network connection is established with a mobile communication network. In step 730, the radio module 120 is destructively removed from the disposable frame to render the disposable frame non-reusable while maintaining the operability of the radio module 120. The radio module 120 may be destructively removed from the disposable frame using a radio module removal port, by breaking breakable contacts, by breaking a breakable latch, by cutting the frame 110, or by any other method of permanent removal that maintains the operability of the radio module 120. Thus, the radio module 120 can be safely removed using safe methods such as tearing perforations, cutting designated lines, using pull strips, or other methods that maintain the operability of the radio module 120. In step 740, the radio module can be coupled to a second mobile communication device. For example, the radio module 120 can be inserted into a radio module socket in a second mobile communication device. Thus, the radio module 120 can be activated and used in the mobile communication device 100 and then transferred to a new mobile communication device. For example, the radio module 120 may be coupled to the mobile communication device 100 using breakable solder points or conductive glue. The radio module 120 may then be removed and inserted into another mobile communication device using a different method such as inserting the radio module 120 into a socket or plug-in port. In step 750, the flowchart 700 ends.

The method of this invention is preferably implemented on a programmed processor. However, the radio module 120, the controller 210, and the radio baseband processing module 220 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. A mobile communication device, comprising:
   a disposable frame;
   a radio module physically and electrically coupled to the disposable frame, the radio module being irreplaceably removable from the disposable frame;
   an audio input module coupled to the disposable frame and the radio module;
   an audio output coupled to the disposable frame and the radio module;
   a power supply module coupled to the disposable frame and the radio module; and
   an antenna coupled to the disposable frame and the radio module.

2. The mobile communication device according to claim 1, wherein the radio module includes
   a radio baseband processing module;
   an audio input; and
   an audio output.

3. The mobile communication device according to claim 2,
   wherein the audio input module comprises an earpiece and acoustic porting coupled between the earpiece and the radio module, and
   wherein the audio output module comprises a mouthpiece and acoustic porting coupled between the mouthpiece and the radio module.

4. The mobile communication device according to claim 1,
   wherein the audio input module comprises a microphone, and
   wherein the audio output module comprises a speaker.

5. The mobile communication device according to claim 1, wherein the audio input nodule and the audio output module comprise a headset jack.

6. The mobile communication device according to claim 1,
   wherein the disposable frame is constructed of cardboard,
   wherein the audio input module comprises an earpiece constructed of vacuum formed plastic, and
   wherein the audio output module comprises an earpiece constructed of vacuum formed plastic.

7. The mobile communication device according to claim 1, wherein the disposable frame includes a radio module destructive removal port for destructive removal of the radio module from the frame while maintaining operability of the radio module.

8. The mobile communication device according to claim 1, further comprising breakable solder bumps, wherein the radio module is coupled to at least the disposable frame and the power supply module using the breakable solder bumps.

9. The mobile communication device according to claim 1, further comprising conductive glue, wherein the radio module is coupled to at least the disposable frame and the power supply module using the conductive glue.

10. The mobile communication device according to claim 1, further comprising a switch coupled to the radio module, wherein the radio module is configured to establish a mobile communication connection with a network in response to activation of the switch.

11. The mobile communication device according to claim 1, further comprising:
   a radio module socket coupled to the disposable frame, the radio module socket also coupled to the audio input module, the audio output module, the power supply module, and the antenna,
   wherein the radio module is detachably coupled to the radio module socket.

12. A disposable mobile communication device, comprising:
   a disposable frame;
   a switch coupled to the frame;
   a radio module destructively coupled to the disposable frame and the switch, the radio module being permanently removable from the disposable frame, the radio module being configured to perform radio baseband processing for a mobile communication network connection, the radio module further being configured to enable a mobile communication network connection in response to activation of the switch;
   an audio input module coupled to the disposable frame and the radio module;
   an audio output module coupled to the disposable frame and the radio module;
   a power supply module coupled to the disposable frame and the radio module; and
   an antenna coupled to the disposable frame and the radio module.

13. The disposable mobile communication device according to claim 12, wherein the disposable frame comprises a cardboard base and a vacuum formed plastic housing, the vacuum formed plastic housing covering the radio module on the cardboard base.

14. The disposable mobile communication device according to claim 12, wherein the disposable frame includes a destructive radio module removal port for destructive removal of the radio module from the frame while maintaining the operability of the radio module.

15. The disposable mobile communication device according to claim 12,
   wherein the audio input module comprises an earpiece and acoustic porting coupled between the earpiece and the radio module, and
   wherein the audio output module comprises a mouthpiece and acoustic porting coupled between the mouthpiece and the radio module.

16. The disposable mobile communication device according to claim 12, further comprising:
   a radio module socket coupled to the disposable frame, the radio module socket also coupled to the audio input module, the audio output module, the power supply module, and the antenna,
   wherein the radio module is detachably coupled to the radio module socket.

17. A method of operating a disposable first mobile communication device, the disposable first mobile communication device including a radio module and a disposable frame, the method comprising:
   establishing a mobile communication network connection with a mobile communication network;
   destructively removing the radio module from the disposable frame to render the disposable frame non-reusable while maintaining the operability of the radio module; and
   electrically and physically coupling the radio module to a second mobile communication device.

18. The method according to claim 17, wherein the first mobile communication device comprises:
   a switch coupled to the disposable frame;

an audio input module coupled to the disposable frame and the radio module;

an audio output module coupled to the disposable frame and the radio module;

a power supply module coupled to the disposable frame and the radio module; and an antenna coupled to the disposable frame and the radio module.

19. The method according to claim 17, wherein the radio module is configured to perform radio baseband processing for the mobile communication network connection.

20. The method according to claim 17, where in destructively removing the radio module further comprises destructively removing the radio module from the disposable frame via a radio module removal port while maintaining the operability of the radio module.

21. The method according to claim 1, where in destructively removing the radio module further comprises tearing perforations in a radio module removal port to remove the radio module.

22. The method according to claim 17, where in destructively removing the radio module further comprises cutting along cut indicators in a radio module removal port to remove the radio module.

23. The method according to claim 17, where in destructively removing the radio module further comprises pulling a radio module removal pull-strip in a radio module removal port to remove the radio module.

24. The method according to claim 17, wherein the coupling step further comprises inserting the radio module into a radio module socket in a second mobile communication device.

25. An operable disposable wireless communication device comprising:

a disposable frame including communication device components; and a reusable and destructively removable radio module electrically coupled to at least one communication device component of the disposable frame, the removable radio module being at least destructively physically attached to the disposable frame.

26. The operable disposable wireless communications device according to claim 25, further comprising:

guide markers coupled to the frame defining a removal port for removing the radio module.

27. The operable disposable wireless communications device according to claim 26, wherein the guide markers comprise perforations in the disposable frame for manually removing the radio module.

28. The operable disposable wireless communications device according to claim 26, wherein the guide markers comprise cut location indicators in the disposable frame for removing the radio module using a cutting tool.

29. The operable disposable wireless communications device according to claim 25, further comprising a pull strip for removing the radio module, the pull strip including a strip of material located between the radio module and the frame, the pull strip decoupling the radio module from the frame when the pull strip is pulled.

* * * * *